(12) United States Patent
Constancon et al.

(10) Patent No.: US 12,436,020 B2
(45) Date of Patent: *Oct. 7, 2025

(54) METHOD AND SYSTEM FOR CALCULATING THE MASS OF MATERIAL IN AN EXCAVATING MACHINE BUCKET

(71) Applicant: Hummingbird Solutions Inc., North Vancouver (CA)

(72) Inventors: Charles Constancon, North Vancouver (CA); Ali Yaghini, North Vancouver (CA)

(73) Assignee: Hummingbird Solutions Inc., North Vancouver (CA)

( * ) Notice: Subject to any disclaimer, the term of this patent is extended or adjusted under 35 U.S.C. 154(b) by 232 days.

This patent is subject to a terminal disclaimer.

(21) Appl. No.: 18/485,153

(22) Filed: Oct. 11, 2023

(65) Prior Publication Data

US 2024/0302201 A1    Sep. 12, 2024

Related U.S. Application Data

(63) Continuation-in-part of application No. 18/365,998, filed on Aug. 6, 2023, which is a continuation-in-part
(Continued)

(51) Int. Cl.
*G01G 19/12* (2006.01)
*E02F 3/58* (2006.01)
(Continued)

(52) U.S. Cl.
CPC ............... *G01G 19/12* (2013.01); *E02F 3/58* (2013.01); *E02F 9/14* (2013.01); *E02F 9/26* (2013.01)

(58) Field of Classification Search
CPC ... E02F 3/304; E02F 3/435; E02F 3/46; E02F 3/58; E02F 9/14; E02F 9/26; E02F 9/264; G01G 19/12
See application file for complete search history.

(56) References Cited

U.S. PATENT DOCUMENTS

| | | | |
|---|---|---|---|
| 4,677,579 A | 6/1987 | Radomilovich | |
| 4,809,794 A | 3/1989 | Blair et al. | |

(Continued)

FOREIGN PATENT DOCUMENTS

DE     10 2015 001 905      8/2016

OTHER PUBLICATIONS

Examination Report from Canadian Application No. 3,113,339, mailed on Dec. 19, 2023, pp. 1-4.

*Primary Examiner* — Tyler J Lee
(74) *Attorney, Agent, or Firm* — The Law Office of Kevin McDermott, P.L.L.C.

(57) ABSTRACT

An aspect of the present disclosure provides a method for calculating the mass of material in an excavating machine bucket including receiving, by a controller, data for determining the distance between at least one sensor mounted on the excavating machine and a target positioned on an arm of the excavating machine. Moreover, the method includes receiving torque data for a rotating hoist drive shaft in the excavating machine. The torque data is generated by a torque sensor positioned about the shaft. Furthermore, the method includes calculating frontend geometry of the excavating machine. The excavating machine includes at least one rope. Additionally, the method includes calculating a rope force in the at least one rope using the torque data and calculating the mass of material in the excavating machine bucket using the calculated frontend geometry and the rope force.

20 Claims, 7 Drawing Sheets

Related U.S. Application Data of application No. 18/178,986, filed on Mar. 6, 2023, now Pat. No. 11,781,286.

(51) Int. Cl.
  *E02F 9/14* (2006.01)
  *E02F 9/26* (2006.01)

(56) References Cited

U.S. PATENT DOCUMENTS

| | | | |
|---|---|---|---|
| 5,499,463 | A | 3/1996 | Profio et al. |
| 5,850,341 | A | 12/1998 | Fournier et al. |
| 5,970,712 | A | 10/1999 | Stein |
| 6,072,127 | A | 6/2000 | Oslakovic |
| 6,225,574 | B1 | 5/2001 | Chang et al. |
| 6,527,130 | B2 | 3/2003 | Ruddy |
| 7,472,009 | B2 * | 12/2008 | Baldwin ............ E02F 9/264 701/50 |
| 7,734,397 | B2 | 6/2010 | Peterson et al. |
| 8,311,970 | B2 | 11/2012 | Mcaree et al. |
| 8,373,078 | B2 | 2/2013 | Madhavarao et al. |
| 8,886,493 | B2 | 11/2014 | Taylor |
| 9,863,118 | B2 | 1/2018 | Brandt et al. |
| 9,950,908 | B2 | 4/2018 | Verheyen et al. |
| 10,227,754 | B2 | 3/2019 | Taylor et al. |
| 10,277,754 | B2 | 4/2019 | Toscano |
| 11,891,772 | B2 | 2/2024 | Ryan |
| 2005/0034902 | A1 | 2/2005 | Madhavarao et al. |
| 2006/0085118 | A1 * | 4/2006 | Baldwin ............ E02F 9/264 701/1 |
| 2009/0018718 | A1 | 1/2009 | Lang et al. |
| 2009/0187527 | A1 | 7/2009 | Mcaree et al. |
| 2010/0010714 | A1 | 1/2010 | Claxton |
| 2010/0283675 | A1 | 11/2010 | McAree et al. |
| 2011/0029279 | A1 | 2/2011 | McAree et al. |
| 2014/0180547 | A1 | 6/2014 | Edara et al. |

* cited by examiner

METHOD AND SYSTEM FOR CALCULATING THE MASS OF MATERIAL IN AN EXCAVATING MACHINE BUCKET

CROSS REFERENCE TO RELATED APPLICATIONS

This is a continuation-in-part application of U.S. patent application Ser. No. 18/365,998, filed Aug. 6, 2023, which is a continuation-in-part application of U.S. patent application Ser. No. 18/178,986, filed Mar. 6, 2023, now U.S. Pat. No. 11,781,286, issued Oct. 10, 2023, the entire disclosures of which are incorporated herein by reference.

BACKGROUND OF THE INVENTION

This invention relates generally to weighing mined materials, and more particularly, to a method and system for calculating the mass of material in an excavating machine bucket.

Large scale mining operations are known to use heavy equipment of large proportions for loading and transporting mined material. Such heavy equipment includes electric rope shovels, draglines and the like. Electric rope shovels with a capacity of 120 tons per scoop are known to load large ultra-off-highway-trucks with a payload capacity of up to 450 tons. Electric rope shovels may be deployed in large mines with several dozen trucks. An accurate load is typically a load that falls within a range of 10% of the payload capacity of a truck.

Frequently, trucks are not accurately loaded which results in inefficiently transporting the mined material via truck. For example, for safety reasons, overloaded trucks (loaded to more than 20% of the OEM truck capacity) cannot operate beyond first gear so are required to dump the load at or near the loading site and to receive another, hopefully, accurate load. Because trucks typically methodically follow each other along a haul route, when a truck like an overloaded truck causes a delay the trucks bunch together which creates a bottleneck along the haul route. As a result of overloading, trucks generally suffer fatigue damage which is expensive to repair and increases costs of maintaining a fleet of trucks. While trucks are being repaired fewer trucks are available so the amount of material that can be transported is reduced. It is known that accurately loading trucks to avoid overloading and the problems related thereto results in productivity gains of between eight (8) and twelve (12) percent.

Mine operators are known to have deployed autonomous truck fleets in order to enhance productivity. Accurately loading each truck in an autonomous truck fleet facilitates improving productivity by reducing load variances between truck loads which facilitates optimizing the haul route travel time, minimizing gaps between trucks and maximizing throughput.

To accurately load each truck, a shovel operator requires immediate feedback regarding the payload in the bucket, or dipper, prior to dumping the payload into the truck. This allows the shovel operator to strategically load and trim pass load the truck to achieve consistent and accurate truck loads with minimal under and overloads. Several measurement systems have been developed to provide immediate feedback.

For example, an electrical parameter method calculates the loads applied to the bucket, for instance by the hoist rope, by measuring the hoist motor armature voltage and the hoist motor armature and field current, which allow calculating a pseudo-static estimate of the torque applied by the hoist motor to the hoist drum. The hoist rope load could be calculated from the hoist torque by applying the drive gear ratio and the drum diameter. However, typical variations in loading estimates of twenty to thirty percent could arise due to specific digging and loading conditions. As a result, such electrical parameter methods do not provide sufficiently accurate results and are no longer used.

Hybrid structural methods are also known to be used for calculating the net mass of the material in the bucket. One such method mounts strain gauges on rear A-Frame legs of the rope shovel. On a rope shovel the load in the rear A-frame legs is proportional to the suspension cable force. The payload is inferred from the suspension cable force. It is known that such hybrid methods can load trucks in an autonomous truck haul fleet within fifteen percent of in ground load scale accuracy ninety percent of the time which does not comport with desired standards of accuracy. Moreover, such methods are difficult to calibrate. Thus, such methods that infer the payload from the suspension cable force lack the resolution to be useful for autonomous haul fleets due to poor accuracy.

On draglines, strain gauges applied to the boom are used to infer the payload through a lookup table of bucket position versus strain gauge output. Calibration is performed by moving the empty bucket (of known mass) through the measurement space and calculating the ratio of strain gauge output to empty bucket mass. Payload is estimated using this approach with heavy averaging applied to eliminate dynamic effects. The method is not generally accurate as there is a large degree of variation.

Mining operators have also been known to deploy direct loadcell measurement methods to generate acceptably accurate results. These methods place a loadcell element directly in the load path of the payload.

The loadcell element measures the suspended load directly using an accurate temperature compensated strain gauge circuit or extensometer. By combining the suspended load measurement with a direct measurement of the acceleration of the suspended mass, Newton's second law of motion can be directly applied, leading to an accurate, inertially compensated mass measurement.

However, the loadcell element is located at the bucket in a very harsh environment and requires a battery pack to power the signal conditioning instrumentation and telemetry. Thus, implementing such methods on a rope shovel requires using complex equipment that uses custom manufactured loadcells, telemetry and battery power to retrieve the measurement. Additionally, the complex equipment is challenging and thus expensive to maintain. Loadcell element measurement methods generally generate accuracies of better than five percent of in ground load scale result ninety-five percent of the time. The current state of the art as required for autonomous haul fleets requires accuracy of at least seven-and-a-half percent of in ground scale accuracy ninety-two-and-a half percent of the time.

Thus, it would be advantageous and an improvement over the relevant technology to provide a measurement method that does not require using expensive complex equipment like battery powered custom manufactured loadcells and telemetry located in the bucket to retrieve the measurement.

BRIEF DESCRIPTION OF THE INVENTION

An aspect of the present disclosure provides a method for calculating the mass of material in an excavating machine bucket including the step of receiving, by a controller, data for determining the distance between at least one sensor mounted on the excavating machine and a target positioned on an arm of the excavating machine. Moreover, the method includes the step of receiving torque data for a rotating hoist drive shaft in the excavating machine. The torque data is generated by a torque sensor positioned about the shaft. Furthermore, the method includes the step of calculating frontend geometry of the excavating machine, where the excavating machine includes at least one rope. Additionally, the method includes the steps of calculating a rope force in the at least one rope using the torque data, and calculating the mass of material in the excavating machine bucket using the calculated frontend geometry and the rope force.

In one embodiment of the present disclosure the target is positioned at an end of the arm, the at least one sensor is attached to an A-frame platform of the excavating machine, and the at least one sensor detects reflections off the target to determine the data.

In yet another embodiment of the present disclosure the step of calculating frontend geometry step further includes calculating a crowd angle and a bail angle using the distance data and geometry of the excavating machine.

In yet another embodiment of the present disclosure, an angular velocity and an angular acceleration are calculated about a crowd pivot of the excavating machine.

In yet another embodiment of the present disclosure the mass of material in the excavating machine bucket is calculated according to the equation $$M_P = \frac{F_R}{g} \frac{[l_{st}\cos(\theta - \alpha) + (h_c + h_B - R_P)\sin(\theta - \alpha)] - M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

where:
$M_P$ is the payload, or the mass of the material in the bucket;
$F_R$ is the rope force in units of mass;
$\alpha$ is the crowd angle;
$\theta$ is the bail angle;
g is the magnitude of the gravity vector and is defined as unity;
$l_{st}$ is the distance from the crowd point to the bail pivot point;
$h_c$ is the height from the crowd point to the target measured perpendicular to the arm;
$h_B$ is the distance from the target to the bail point measured perpendicular to the arm;
$R_P$ is the radius of the crowd pinion;
$M_E$ is the mass of the empty bucket assembly;
$X_{gE}$ is the distance from the center of gravity of the empty bucket assembly to the bail pivot measured along the longitudinal axis of the arm, and $Y_{gE}$ is the distance from crowd pivot (48) to the center of gravity of the empty bucket assembly measured along an axis perpendicular to the arm; and
$X_{gP}$ is the distance from the bail pivot to the center of gravity of the payload as measured along the longitudinal axis of the arm, and $Y_{gP}$ is the distance from crowd pivot (48) to the center of gravity of the payload measured along an axis perpendicular to the arm.

In yet another embodiment of the present disclosure an inertial correction of the mass of material is calculated using an angular acceleration about the crowd pivot and a bucket assembly mass moment of inertia about the crowd pivot.

In yet another embodiment of the present disclosure the excavating machine includes a hoist motor and a hoist gear box, and the torque sensor is positioned between the hoist motor and the hoist gear box.

In yet another embodiment of the present disclosure the rope force is calculated according to the equation $$F_R = \frac{GR}{R_D} \cdot T,$$

where $F_R$ is the rope force, GR is the hoist drive gear ratio, $R_D$ is the radius from the centerline of the hoist drum to the centerline of the hoist rope, and T is the torque data.

Another aspect of the present disclosure provides a controller for calculating the mass of material in an excavating machine bucket that includes a processor and a memory configured to store data. The controller is associated with a network and the memory is in communication with the processor and has instructions stored thereon which, when read and executed by the processor, cause the controller to receive data for determining the distance between at least one sensor mounted on the excavating machine and a target positioned on an arm of the excavating machine.

The instructions when read and executed by the processor further cause the controller to receive torque data for a rotating hoist drive shaft in the excavating machine. The torque data is generated by a torque sensor positioned about the shaft. Moreover, the instructions when read and executed by the processor cause the controller to calculate frontend geometry of the excavating machine. The excavating machine includes at least one rope. Furthermore, the instructions when read and executed by the processor cause the controller to calculate a rope force in the at least one rope using the torque data and calculate the mass of material in the excavating machine bucket using the calculated frontend geometry and the rope force.

In an embodiment of the present disclosure the target is positioned at an end of the arm, the at least one sensor is attached to an A-frame platform of the excavating machine, and the at least one sensor detects reflections off the target to determine the data.

In yet another embodiment of the present disclosure the instructions when read and executed by the processor, cause the controller to calculate a crowd angle and a bail angle using the distance data and geometry of the excavating machine, and to calculate an angular velocity and an angular acceleration about a crowd pivot of the excavating machine.

In another embodiment of the present disclosure the instructions when read and executed by said processor, cause said controller to calculate the mass of material in the excavating machine bucket according to the equation $$M_P = \frac{F_R}{g} \frac{[l_{st}\cos(\theta - \alpha) + (h_c + h_B - R_P)\sin(\theta - \alpha)] - M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

where:
$M_P$ is the payload, or the mass of the material in the bucket;
$F_R$ is the rope force in units of mass;
$\alpha$ is the crowd angle;
$\theta$ is the bail angle;
g is the magnitude of the gravity vector and is defined as unity;
$l_{st}$ is the distance from the crowd point to the bail pivot point;

$h_c$ is the height from the crowd point to the target measured perpendicular to the arm;
$h_B$ is the distance from the target to the bail point measured perpendicular to the arm;
$R_P$ is the radius of the crowd pinion;
$M_E$ is the mass of the empty bucket assembly;
$X_{gE}$ is the distance from the center of gravity of the empty bucket assembly to the bail pivot measured along the longitudinal axis of the arm, and $Y_{gE}$ is the distance from crowd pivot (48) to the center of gravity of the empty bucket assembly measured along an axis perpendicular to the arm; and
$X_{gP}$ is the distance from the bail pivot to the center of gravity of the payload as measured along the longitudinal axis of the arm, and $Y_{gP}$ is the distance from crowd pivot (48) to the center of gravity of the payload measured along an axis perpendicular to the arm. In another embodiment of the present disclosure the instructions when read and executed by the processor, cause the controller to calculate an inertial acceleration about the crowd pivot and a bucket assembly mass moment of inertia about the crowd pivot.

In another embodiment of the present disclosure the instructions when read and executed by the processor, cause the controller to calculate the rope force according to the equation $$F_R = \frac{GR}{R_D} \cdot T,$$

where $F_R$ is the rope force, GR is the hoist drive gear ratio, $R_D$ is the radius from the centerline of the hoist drum to the centerline of the hoist rope, and T is the torque data.

Another aspect of the present disclosure provides an excavating machine that includes a machinery house including an A-frame platform, an arm, a hoist motor, a rotating hoist drive shaft, and a hoist gear box, a torque sensor is positioned about the rotating hoist drive shaft between the hoist motor and hoist gear box. The excavating machine further includes a rope, a bucket, and a controller that includes a processor and a memory configured to store data. The memory is in communication with the processor and has instructions stored thereon which, when read and executed by the processor, cause the controller receive data for determining the distance between at least one sensor mounted on the excavating machine and a target positioned on an end of the arm. Moreover, the instructions when read and executed by the processor cause the controller to receive torque data generated by the torque sensor, calculate frontend geometry of the excavating machine, calculate a rope force in the rope using the torque data, and calculate the mass of material in the bucket using the calculated frontend geometry and the rope force.

In another embodiment of the present disclosure the at least one sensor detects reflections off the target to determine the data.

In another embodiment of the present disclosure the instructions when read and executed by the processor, cause the controller to calculate a crowd angle and a bail angle using the distance data and geometry of the excavating machine, and calculate an angular velocity and an angular acceleration about a crowd pivot of the excavating machine.

In yet another embodiment of the present disclosure the instructions when read and executed by the processor, cause the controller to calculate the mass of material in the bucket according to the equation $$M_P = \frac{F_R}{g} \frac{M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

where:
$M_P$ is the payload, or the mass of the material in the bucket;
$F_R$ is the rope force in units of mass;
$\alpha$ is the crowd angle;
$\theta$ is the bail angle;
g is the magnitude of the gravity vector and is defined as unity;
$l_{st}$ is the distance from the crowd point to the bail pivot point;
$h_c$ is the height from the crowd point to the target measured perpendicular to the arm;
$h_B$ is the distance from the target to the bail point measured perpendicular to the arm;
$R_P$ is the radius of the crowd pinion;
$M_E$ is the mass of the empty bucket assembly;
$X_{gE}$ is the distance from the center of gravity of the empty bucket assembly to the bail pivot measured along the longitudinal axis of the arm, and $Y_{gE}$ is the distance from crowd pivot (48) to the center of gravity of the empty bucket assembly measured along an axis perpendicular to the arm; and
$X_{gP}$ is the distance from the bail pivot to the center of gravity of the payload as measured along the longitudinal axis of the arm, and $Y_{gP}$ is the distance from crowd pivot (48) to the center of gravity of the payload measured along an axis perpendicular to the arm.

In another embodiment of the present disclosure the instructions when read and executed by the processor, cause the controller to calculate an inertial acceleration about a crowd pivot and a bucket assembly mass moment of inertia about the crowd pivot.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
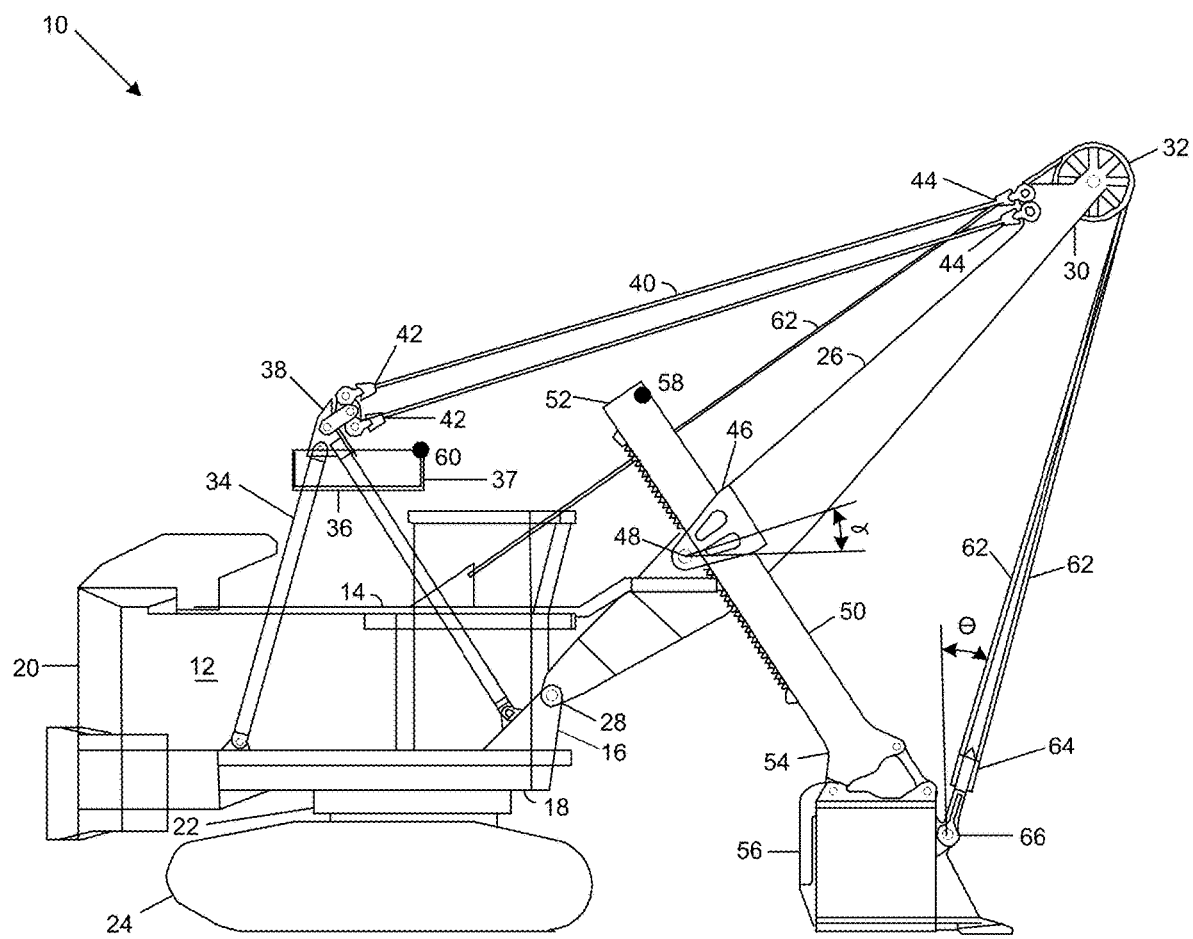
FIG. 1 is a side view of an example excavating machine that may be used to excavate material from a mine according to an embodiment of the present disclosure.

FIG. 1 is side view of an example excavating machine 10 in accordance with an embodiment of the present disclosure. The excavating machine 10 may be used for excavating material from, for example, a mine.

The excavating machine 10 includes a machinery house 12 that has a top 14, a front side 16, a bottom 18, and a back side 20. The bottom 18 is attached to a mount 22 of a translation mechanism 24. The machinery house 12 is attached to the mount in a manner that permits the machinery house 12 to rotate three-hundred-sixty degrees about a vertical axis of the mount 22 without being impeded by the translation mechanism 24. The machinery house 12 also includes a hoist cable drum (not shown).

A boom 26 having a first end 28 and a second end 30 is attached to the machinery house 12. More specifically, the first end 28 of the boom 26 is fixedly attached to the front 16 of the machinery house 12 such that the boom 26 extends away from the front 16 at a fixed angle. A sheave 32 is rotatably attached to the second end 30 of the boom 26.

The machinery house 12 also includes an A-frame 34 which can include a platform 36 and a top 38. Boom cables 40 are attached to the top 38 and extend away from the A-frame 34. Each boom cable 40 has a first end 42 and a second end 44. The first end 42 of each boom cable 40 is rotatably attached to the top 38 of the A-frame 34 and the second end 44 of each boom cable 40 is rotatably attached to the second end 30 of the boom 26. The boom cables 40 thus facilitate supporting the boom 26.

A saddle block 46 can be rotatably attached to the boom 26 at a crowd arm pivot point 48. A crowd arm 50 can be securely fitted within the saddle block 46 to enable sliding the crowd arm 50 in and out of the saddle block 46. By virtue of being securely fitted within the saddle block 46, the crowd arm 50 is rotatably attached to the boom 26. The crowd arm 50 has a first end 52 and a second end 54. A bucket 56 is rigidly fixed to the second end 54 of the crowd arm 50 and a target 58 can be removably attached to the first end 52 of the crowd arm 50.

The saddle block 46 is free to pivot about the crowd arm pivot point 48 as the bucket 56 is raised and lowered. The in and out sliding motion of the crowd arm 50 in the saddle block 46 can be actuated by a rack and pinion mechanism which forcibly moves the crowd arm 50 in either an inward direction towards the excavating machine 10 or an outward direction away from the excavating machine 10 in a push-pull manner. In other embodiments, the in and out sliding motion of the crowd arm 50 may be actuated by cables (not shown) through a series of pulleys (not shown).

A distance sensor 60 is attached to a side 37 of the platform 36 that faces the target 58. The distance sensor 60 may be, for example a light detection and ranging (L.I.-.D.A.R.) device. Alternatively, the distance sensor 60 may be any type of device that can be fitted on the platform 36 and is capable of dynamically detecting a distance between the distance sensor 60 and the target 58 based on reflections or otherwise. For example, the distance sensor 60 may alternatively be a radar device capable of detecting the range and heading of the target 58 during operation of the excavating machine 10-. When the distance sensor 60 is a radar device, the target 58 should be a highly reflective radar target 58.

Hoist cables 62 extend away from the hoist cable drum (not shown) to the sheave 32. The cables 62 can each engage respective grooves in the sheave perimeter. The cables 62 extend about part of the sheave perimeter and extend from the sheave 32 to a ball pivot point 66. The ends 64 of the hoist cables 62 are rotatably attached to the bucket 56 at the bail pivot point 66. The bucket 56 is suspended from the hoist cables 62. The hoist cables 62 may be any type of cable capable of supporting the mass of loads typically carried by the bucket 56. For example, the hoist cables 62 may be a steel cable or rope.

The distance sensor 60 captures data that facilitates dynamically determining the frontend geometry of the excavating machine 10. The frontend geometry includes the geometric relationships between the components of the excavating machine 10. For example, the geometric relationships between the machinery house 12, the boom 26, the crowd arm 50, the bucket 56, boom cables 40, hoist cable 62, the A-frame 34, and the hoist cable drum (not shown).

A crowd angle $\alpha$ may be calculated at the crowd arm pivot point 48 between the horizontal axis and the longitudinal axis of the crowd arm, and a bail angle $\theta$ may be calculated between the hoist cable 62 and a vertical axis. For any combination of crowd angle $\alpha$ and bail angle $\theta$ calculated while the bucket 56 dynamically moves, the frontend geometry of the excavating machine can be calculated. The crowd angle $\alpha$ may be calculated using the equation $$\sin(A + \alpha) = \frac{h_c}{\sqrt{(X_L + LD_X)^2 + (Y_L + LD_Y)^2}}$$

where:

$\alpha$ is the crowd angle;

$h_c$ is the height from the crowd arm pivot point 48 to the target 58 measured perpendicular to the crowd arm 50;

$X_L$ and $Y_L$ are the X and Y coordinates, respectively, of the distance sensor 60 relative to the crown arm pivot point 48;

$LD_X$ and $LD_Y$ are the X and Y-coordinates, respectively, of the target 58 relative to the distance sensor 60; and The angle A can be calculated from the equation:

$$\sin A (Y_L + LD_Y)/\sqrt{(X_L + LD_X)^2 + (Y_L + LD_Y)^2}$$

After calculating the crowd angle α, a variable $l_c$ may be calculated. The variable $l_c$ depends on the geometry of the bucket 56 and may be calculated according to the equation $$l_c = \{X_L + LD_X\}\cos\alpha + \{Y_L + LD_Y\}\sin\alpha$$

The bail angle θ may be calculated using the equation $$\theta = \frac{\pi}{2} + \gamma + \alpha - \varphi - \cos^{-1}\left[-(l_B^2 - l_{hst}^2 - l_R^2)/(2l_{hst}l_R)\right]$$

where:
θ is the crowd angle;

$$\gamma = \sin^{-1}\left(\frac{h_c + h_B}{l_{hst}}\right);$$

$$\varphi = \sin^{-1}\left(\frac{R_{Sc}}{l_R}\right);$$

$l_B$ is the length between the crowd arm pivot point 48 and the center of the sheave 32;
$R_S$ is the head sheave 32 radius;
$l_{hst}$ is the length of the crowd arm 50 from the target 58 to the bail pivot 66; and $$l_R = \sqrt{l_{hst}^2 + l_B^2 - 2l_{hst}l_B\cos(\theta_B - \alpha - \gamma)}.$$

It is contemplated by the present disclosure that as the excavating machine 10 operates, the frontend geometry may require correction to account for pitch and roll of the machine 10. The pitch and roll angles of the machine 10 are dynamically calculated and change while the machine 10 operates. The correction may be implemented, for example, by adding or subtracting the pitch and roll angles to the bail and crowd angles. An inertial measurement unit (IMU) can be mounted on the excavating machine 10 to dynamically measure the pitch and roll angles of the excavating machine 10 during operation. Alternatively, any device capable of measuring the pitch and roll angles of the excavating machine 10 may be used.

Mining operators have been known to deploy direct loadcell measurement methods to generate acceptably accurate calculations regarding the mass of the material in the bucket 56. A loadcell element measures the mass of the load in the bucket 56 using an accurate temperature compensated strain gauge circuit or extensometer. By combining the load measurement with a direct measurement of the acceleration of the suspended mass, Newton's second law of motion can be directly applied, leading to an accurate, inertially compensated mass measurement.

However, the loadcell element is located at the bucket 56 in a very harsh environment and requires a battery pack to power the signal conditioning instrumentation and telemetry. Thus, implementing such methods on a rope shovel like the excavating machine 10 requires complex equipment that uses custom manufactured loadcells, telemetry and battery power to retrieve the mass measurement. Additionally, the complex equipment is difficult and expensive to maintain.

To address these problems a controller can receive distance data that represents the distance between the distance sensor 60 mounted on the excavating machine 10 and the target 58 positioned on the crowd arm 50 of the excavating machine 10. Torque data for a rotating hoist drive shaft in the excavating machine 10 may also be received by the controller. The torque data can be generated by a torque sensor positioned about the hoist drive shaft. The controller can calculate the frontend geometry of the excavating machine 10. The excavating machine can include one or more ropes or cables. Moreover, the controller can calculate a rope force in the rope using the torque data and can calculate the mass of material in the excavating machine bucket using the calculated frontend geometry and the rope force.

Figure 2:
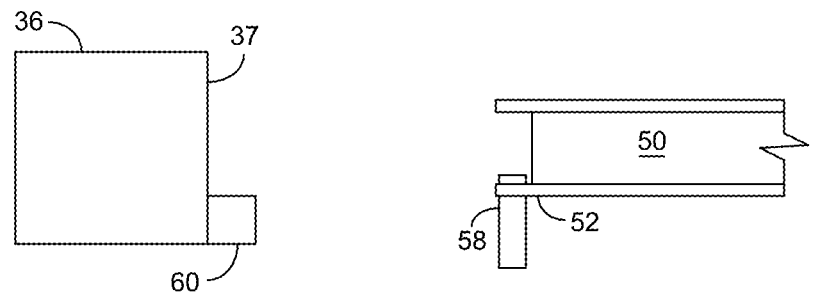
FIG. 2 is a top view of an example platform and an example target in the example excavating machine as shown in FIG. 1.

FIG. 2 is a top view of the platform 36 and the crowd arm 50. More specifically, the distance sensor 60 is positioned on a corner of the platform 36 along the side 37. Alternatively, the distance sensor 60 may be positioned anywhere along the side 37 or anywhere on the excavating machine 10 that enables dynamically and accurately detecting the distance between the sensor 60 and the target 58 as described herein.

The target 58 can be removably attached to a side of the crowd arm 50 at the first end 52. The target 58 may alternatively be attached to the crowd arm 50 in any manner. Moreover, the target 58 may alternatively be located at any position on the crowd arm 50 or at any location on the excavating machine 10 that facilitates dynamically and accurately detecting the distance between the target 58 and the sensor 60 as described herein.

It is contemplated by the present disclosure that the target 58 may alternatively be located at any position on the moving frontend geometry of the excavating machine 10 and that one or more distance sensors 60 may alternatively, or additionally, be fixed to the bucket 56 in any position that facilitates dynamically and accurately detecting the distance between the target 58 and the sensor 60 as described herein. Alternatively, the target 58 may be positioned in a fixed machine reference system of the excavating machine 10 while one or more distance sensors 60 may be positioned on the moving geometry of the excavating machine 10.

The target 58 is a cylinder having a circular cross-sectional area that extends away from the crowd arm 50. Alternatively, the target 58 may have any cross-sectional area and/or length that facilitates dynamically and accurately determining the distance between the target 58 and the sensor 60 as described herein. The surface of the target 58 can be partially or completely covered by reflective tape. The positions of the distance sensor 60 and of the target 58 may be expressed in cartesian coordinates.

During operation of the excavating machine 10, the distance sensor 60 emits illumination which reflects off the target 58 and other components of the excavating machine 10. The distance sensor 60 receives the reflections. The time of flight of these reflections can be used to calculate the distance between the distance sensor 60 and the target 58 for any position of the bucket 56 during operation of the excavating machine 10. The reflections from the target 58 have a higher reflectivity measurement than the reflective measurements off the other components of the excavating machine 10. As a result, the reflective measurements from the target 58 can be rapidly discriminated from the reflectivity measurements off the other components, which enables calculating in real time the position of the target 58 and thus the distance between the sensor 60 and the target 58.

The information shown in FIG. 3 includes some of the same information shown in FIG. 2 as described in more detail below. As such, features illustrated in FIG. 3 that are identical to features illustrated in FIG. 2 are identified using the same reference numerals used in FIG. 2.

Figure 3:
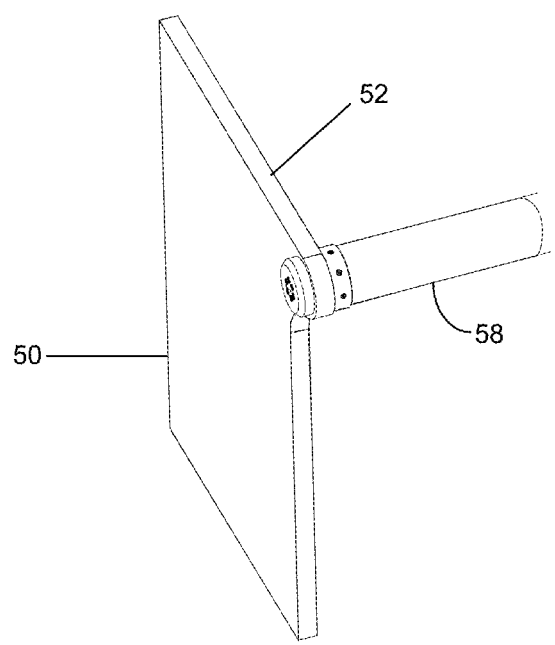
FIG. 3 is an exploded perspective view of the example target as shown in FIG. 2.

FIG. 3 is an exploded perspective view of the target 58 removably attached to the first end 52 of the crowd arm 50.

Figure 4:
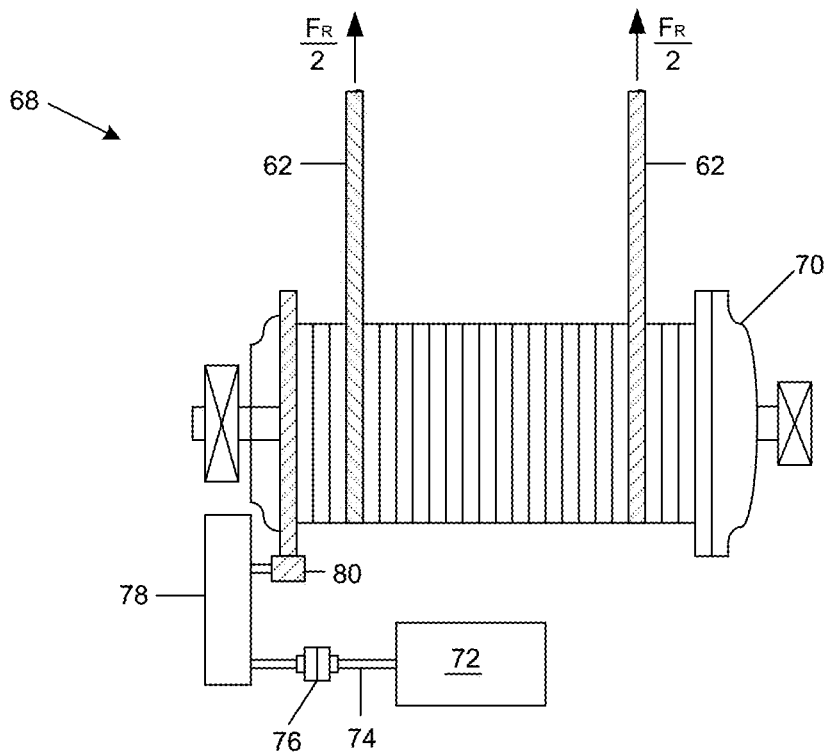
FIG. 4 is a diagram illustrating an example hoist cable drum and an example hoist drive motor in the example excavating machine.

FIG. 4 is a diagram 68 illustrating a hoist cable drum 70 operated by a hoist drive motor 72 both of which are included in the machinery house 12. The hoist cable 62 is wound around the drum 70. Two lengths of the hoist cable 62 are fed from the drum 70. However, it is contemplated by the present disclosure that more or fewer lengths of cable 62 may be fed from the drum 70. A rope force $F_R$ is distributed equally between the two lengths of cable 62.

The hoist drive motor 72 can rotate the hoist cable drum 70 to retract or extend the cable 62 to thus raise or lower, respectively, the bucket 56. More specifically, during operation of the excavating machine 10 the hoist drive motor 72 rotates a hoist drive shaft 74. The hoist drive shaft 74 is connected to a gear coupling 76 and the gear coupling 76 is connected to a shaft of a reduction gear box 78. The reduction gear box 78 drives a pinion 80 which in turn facilitates rotating the hoist cable drum 70 and thus lowering and/or raising the bucket 56. Thus, the hoist drive motor 72 imparts mechanical torque to the reduction gear box 78. A mechanical torque sensor may be installed on the hoist drive shaft 74 to measure the torque imparted by the hoist drive motor 72 to the reduction gear box 78.

Figure 5:
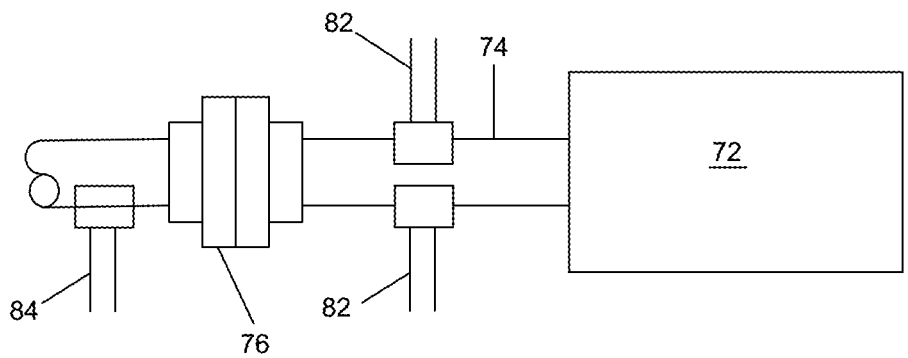
FIG. 5 is an exploded view of the hoist drive motor.

The information shown in FIG. 5 is the same information shown in FIG. 4 as described in more detail below. As such, features illustrated in FIG. 5 that are identical to features illustrated in FIG. 4 are identified using the same reference numerals used in FIG. 4.

FIG. 5 is an exploded view of the hoist drive motor 72, hoist drive shaft 74, and gear coupling 76 as shown in FIG. 4, further including a mechanical torque sensor 82 and an optical shaft speed encoder 84. The mechanical torque sensor 82 can be a strain gauge-based system that uses a Wheatstone bridge. Such strain gauge-based systems mount the strain gauges directly on the hoist drive shaft 74 and use a telemetry system to transmit a bridge voltage to a stationary receiver. The strain gauges measure shear strain in the hoist drive shaft 74. It is contemplated by the present disclosure that two independent torque sensors 82 maybe mounted on opposite sides of the hoist drive shaft 74, one-hundred-eighty degrees apart.

The measured shear strain can be used to calculate the mechanical torque imparted by the hoist drive motor 72 to the reduction gear box 78. More specifically, the mechanical torque can be calculated according to the equation $$T = \tau \cdot r / J$$

where T is the mechanical torque, r is the radius of the hoist drive shaft 74, J is the polar moment of inertia of the hoist drive shaft 74, and τ is the shear stress. The polar moment of inertia is calculated according to the equation $$J = \frac{\pi}{2} r^4.$$

The shear stress t can be measured using a full bridge strain gauge circuit with the strain gauges aligned along the plus and minus 45-degree helical axes of the hoist drive shaft 74. For an excitation voltage $V_{Exc}$, the mechanical torque can be calculated as:

$$T = \frac{V_{Out}}{V_{Exc}} \cdot \frac{G \cdot r}{k \cdot J}.$$

Where $$G = \frac{E}{2(1 + \mu)}$$

Where E is the Youngs Modulus of the material, μ is the Poisson Ratio, k is the gauge factor for the strain gauge used in the bridges, $V_{Exc}$ is the bridge excitation voltage and $V_{Out}$ is the measured bridge output voltage.

Using this method, the mechanical torque delivered to the drive system by the hoist drive motor 72 can be directly measured. The calculated torque can be used to calculate the rope force ($F_R$) according to the equation $$F_R = \frac{GR}{R_D} \cdot T,$$

where IR is the rope force, GR is the hoist drive gear ratio, $R_D$ is the radius from the centerline of the hoist drum to the centerline of the hoist rope, and T is the torque data.

The net mass of material in the bucket 56 is calculated by monitoring the mechanical torque T supplied by the hoist drive motor 72. The inaccuracies of known systems for weighing the material in the bucket 56 are overcome by using direct mechanical torque measurements and calculating the rope force $F_R$ using correction factors for conservative and non-conservative losses and through the use of a dynamic calculation of payload motion and the material mass.

The optical shaft speed encoder 84 can be used to determine the angular velocity of the hoist drive shaft 72 and scaled using the reduction gear box ratio to obtain the angular velocity of the hoist cable drum 70. The angular velocity can be differentiated to obtain the angular acceleration of the hoist cable drum 70. Various smoothing algorithms can be applied to reduce the noise associated with numerical differentiation of a signal. Applying the measurements from the distance sensor 60, together with the geometry of the excavating machine 10, the crowd a angle and bail θ angle can be calculated.

Numerical differentiation can be applied to obtain the linear crowd acceleration along the longitudinal axis of the crowd arm 50 and the angular acceleration of the crowd arm 50 about the crowd arm pivot point 48. The angular acceleration of the hoist cable drum 70, the angular acceleration of the crowd arm 50, and the linear acceleration of the crowd arm 50 can be applied to formulate the inertial loading and to calculate the payload mass compensated for by the inertial forces.

As the mechanical torque is imparted on the hoist drive shaft 74 by the hoist drive motor 72, the hoist cables 62 stretch or relax depending on whether the mechanical torque is increasing or decreasing, respectively. This stretching and relaxing represents a conservative torque affecting the amount of torque ultimately delivered to the bucket 56 by the rope force $F_R$. To compensate for this conservative effect, inertial loads due to the acceleration of the bucket 56 and the angular acceleration of the drive components, namely the motor rotor and the rotary gear/shaft components in the reduction gearbox, can be calculated and combined with the measured mechanical torque produced by the hoist drive motor 72 and measured by the torque sensor 82 to calculate the payload or mass of the material in the bucket 56.

Figure 6:
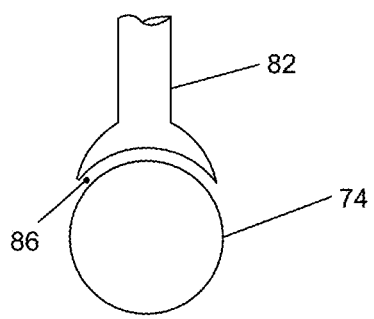
FIG. 6 is an exploded view of an example magnetoelastic torque sensor positioned about a hoist drive shaft.

Although a strain gauge-based system that uses a Wheatstone bridge is described herein, it is contemplated by the present disclosure that other torque sensors may alternatively be used to calculate the torque imparted on the hoist drive shaft 74 by the hoist drive motor 72. For example, a magnetoelastic torque sensor may be used. Magnetoelastic sensors have similar resolution, accuracy and stability as strain gauge-based systems and have advantages over the strain gauge-based system sensors. For example, magnetoelastic torque sensors are not mounted to the hoist drive shaft 74 so there is a gap between the sensor and the shaft 74, the angular velocity and acceleration of the hoist drive shaft 74 can be measured while the torque is measured. FIG. 6 is a cross-sectional view of the hoist drive shaft 74 and a magnetoelastic torque sensor 82 positioned about the shaft 74. There is a gap 86 between the shaft 74 and the sensor 82. Thus, it can be seen that torque data can be generated by the magnetoelastic torque sensor 82 positioned about the hoist drive shaft 74 while being in contactless relation with the shaft 74. Although a single magnetoelastic torque sensor 82 is shown, it is contemplated by the present disclosure that another or complementary magnetoelastic torque sensor 82 may be positioned about the shaft 74 opposite the single sensor 82. Typically, the magnetoelastic torque sensors are mounted in a fixed housing that places them one-hundred-eighty degrees apart in the horizontal or vertical axis.

The reduction gear box 78 is an expensive long lead time item. Unscheduled failures result in excavating machine 10 downtime and consequential production losses. One of the modes of failure of the reduction gear box 78 is associated with lack of alignment between the hoist drive motor 72 and the reduction gear box. Typically, the hoist drive motor 72 is connected to the reduction gear box 78 using the gear coupling 76.

The gear coupling 76 can accommodate some angular misalignment between the reduction gear box 78 and the hoist drive motor 72. However, the amount is difficult to quantify and monitor without stopping the excavating machine 10 and performing manual laser alignment measurements. Such cessations of the excavating machine 10 are time consuming and costly. Deformation or structural cracking of the hoist drive shaft 74, gear coupling 76 or the shaft of the reduction gear box affects the alignment motor/drive alignment, which can cause rapid failure of the reduction gear box 78.

As described herein, two independent mechanical torque sensors 82 can be implemented to measure torque in the hoist drive shaft 74. By averaging the output of the sensors 82, a more robust torque measurement is calculated which is insensitive to in-plane shear forces. Calculating the difference between the output of the sensors 82 yields a measurement that detects in-plane shear forces and is insensitive to torque. The in-plane shear force can be continuously monitored to facilitate detecting any developing deformation and any developing structural failures.

A threshold value can be determined that reflects possible development of deformation and/or structural failures in the hoist drive shaft 74, gear coupling 76, the shaft of the reduction gear box 78, or any other components that facilitate communication between the hoist drive motor 72 and the reduction gear box 78. The in-plane shear forces may be continuously compared against the threshold value for real-time analysis during operation of the excavating machine 10. When the in-plane shear forces exceed the threshold value, an alert may be generated indicating that maintenance is required for the hoist drive shaft 74, gear coupling 76, the shaft of the reduction gear box 78, and/or any other components that facilitate communication between the hoist drive motor 72 and the reduction gear box 78. As a result, excavating machine 10 downtime and related production losses are facilitated to be reduced. Moreover, it can be seen that real-time analysis of the in-plane shear force facilitates real-time and early detection of misalignment between the hoist drive motor 72 and the reduction gear box 78. Similarly, motor torque could be applied to determine gear mesh health.

For magnetoelastic sensors 82, which are mounted in a fixed reference to the excavating machine 10 axes, in-plane shear force in one direction can be measured. For example, if the sensors are mounted in a housing that places them along the horizontal axis of the excavating machine 10, only in-plane horizontal shear can be measured. In plane horizontal and vertical shear can be measured by mounting four magnetoelastic sensors, two along the horizontal axis (i.e., X-axis) and two along the vertical axis (i.e., Y-axis) of the excavating machine 10.

The information shown in FIG. 7 includes most of the same information shown in FIG. 1 as described in more detail below. As such, features illustrated in FIG. 7 that are identical to features illustrated in FIG. 1 are identified using the same reference numerals used in FIG. 1.

Figure 7:
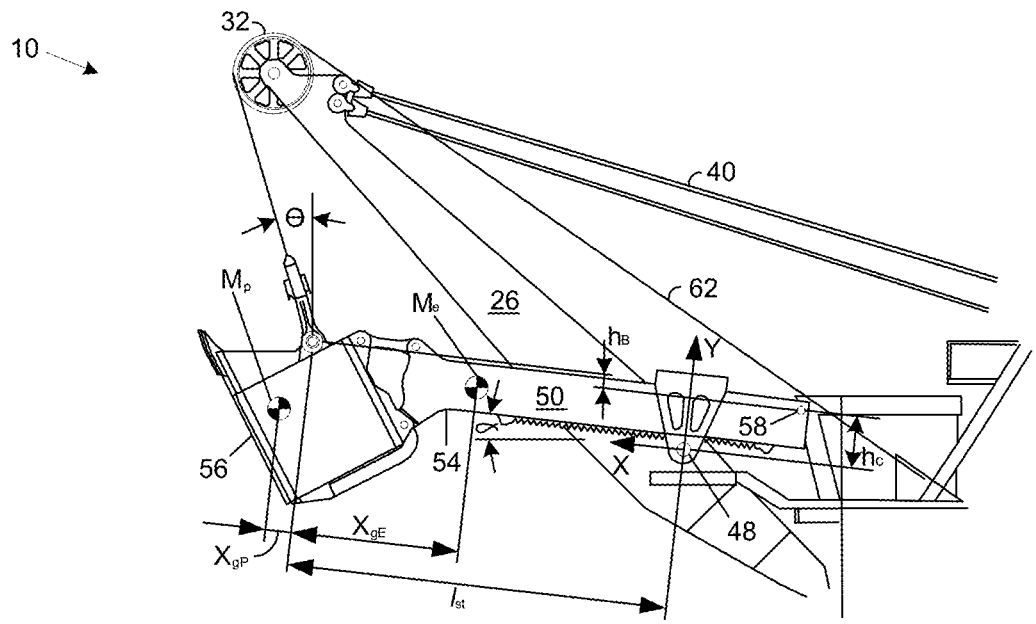
FIG. 7 is a partial side view of the excavating machine with a bucket in a first position.

FIG. 7 is a side view of the excavating machine 10, similar to that shown in FIG. 1. However, the view is of a different side. FIG. 7 illustrates variables that may be used to calculate the mass of the material in the bucket 56 according to the equation $$M_P = \frac{F_R}{g} \frac{M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

where:
$M_P$ is the payload, or the mass of the material in the bucket;
$F_R$ is the rope force in units of mass;
$\alpha$ is the crowd angle;
$\theta$ is the bail angle;
g is the magnitude of the gravity vector and is defined as unity;
$l_{st}$ is the distance from the crowd point to the bail pivot point;
$h_c$ is the height from the crowd point to the target measured perpendicular to the arm;
$h_B$ is the distance from the target to the bail point measured perpendicular to the arm;
$R_P$ is the radius of the crowd pinion;
$M_E$ is the mass of the empty bucket assembly;
$X_{gE}$ is the distance from the center of gravity of the empty bucket assembly to the bail pivot measured along the longitudinal axis of the arm, and $Y_{gE}$ is the distance from crowd pivot (48) to the center of gravity of the empty bucket assembly measured along an axis perpendicular to the arm; and
$X_{gP}$ is the distance from the bail pivot to the center of gravity of the payload as measured along the longitudinal axis of the arm, and $Y_{gP}$ is the distance from crowd pivot (48) to the center of gravity of the payload measured along an axis perpendicular to the arm.

The mass of the material in the bucket 56 may alternatively be calculated according to the equation $$M_P = \frac{-\vec{R}_B \times \vec{F}_R - M_e \vec{R}_{ge} \times \vec{g} - \vec{T}_P}{\vec{R}_{gP} \times \vec{g}}$$

where:

$M_P$ is the payload, or the mass of the material in the bucket;

$\vec{R}_B$ is a position vector in fixed X, Y co-ordinates from the crowd arm pivot point 48 to the bail pivot 66;

$\vec{R}_{ge}$ is a position vector in fixed X, Y co-ordinates from the crowd arm pivot point 48 to the center of gravity of the empty bucket 56 $M_e$;

$\vec{R}_{gP}$ is a position vector in fixed X, Y co-ordinates from the crowd arm pivot point 48 to the center of gravity of the payload $M_P$;

$\vec{g}$ is the gravity vector defined vertically downwards with a magnitude of unity; and $\vec{T}_P$ is the torque applied to the crowd pinion shaft.

It should be understood that as used herein, the designation of an arrow above a variable indicates the variable is a vector having magnitude and direction.

The information shown in FIG. 8 includes the same information shown in FIG. 7 as described in more detail below. As such, features illustrated in FIG. 8 that are identical to features illustrated in FIG. 7 are identified using the same reference numerals used in FIG. 7.

Figure 8:
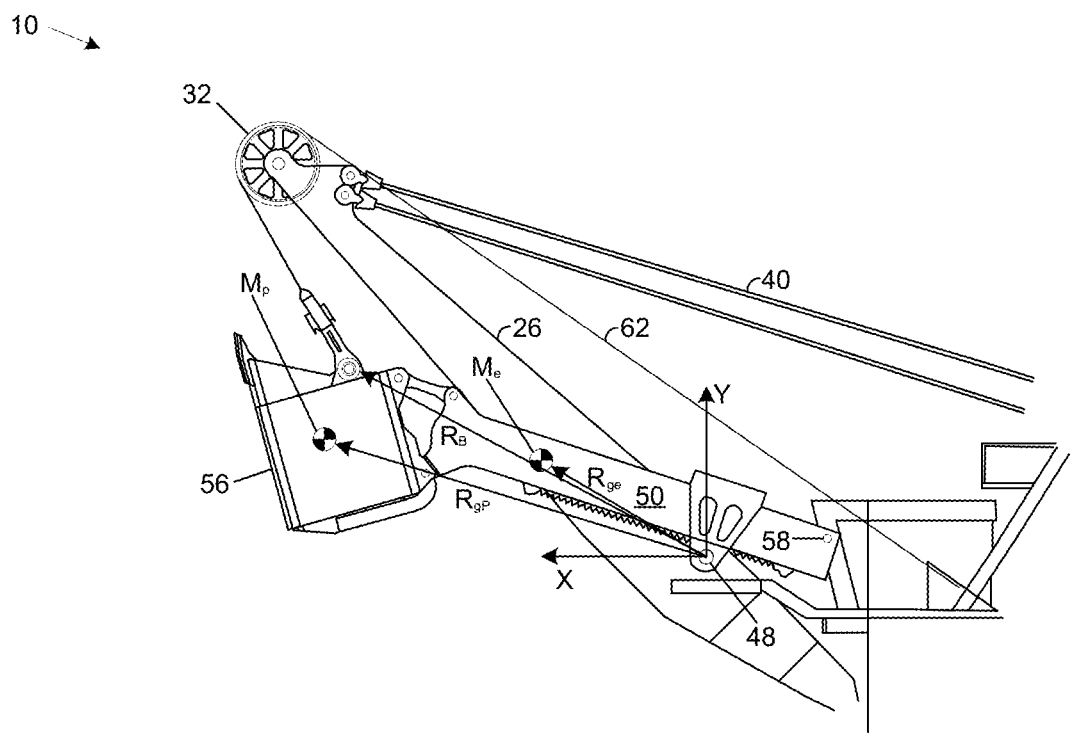
FIG. 8 is a partial side view of the excavating machine with the bucket in a different position.

FIG. 8 is a side view of the excavating machine 10, similar to that shown in FIG. 7. FIG. 8 illustrates variables that may be used to calculate the mass of the material in the bucket 56 according to the equation $$M_P = \frac{-\vec{R}_B \times \vec{F}_R - M_e \vec{R}_{ge} \times \vec{g} - \vec{T}_P}{\vec{R}_{gP} \times \vec{g}}.$$

Figure 9:
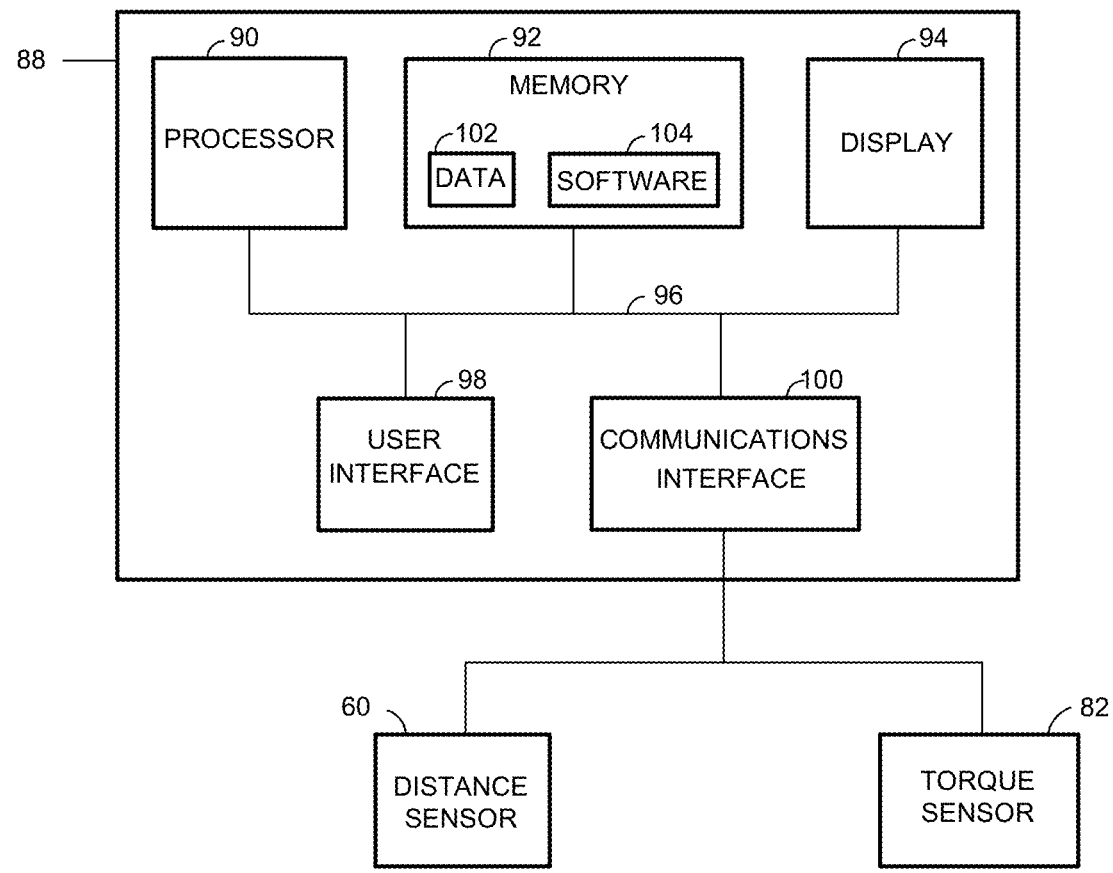
FIG. 9 is a block diagram illustrating an example system controller for use in calculating the mass of material in the bucket.

FIG. 9 is a block diagram illustrating an example system controller 88 for use in calculating the mass of material in the excavating machine bucket 56 according to an embodiment of the present disclosure. The controller 88 can be located in the machinery house 12 for easy access by the operator of the excavating machine 10. The controller 88 includes components such as, but not limited to, one or more processors 90, a memory 92, a display 94, a bus 96, a user interface 98, and a communications interface 100. General communication between the components in the controller 88 is provided via the bus 96.

The processor 90 executes software instructions, or computer programs, stored in the memory 92. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 92 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 92 may be used to store any type of data 102 including, but not limited to, distance data, image data, any data that may facilitate determining the position of the target 58, mechanical torque data, bail angles, crowd angles, moments of inertia, frontend geometry data, and the mass of material in the bucket 56.

Additionally, the memory 92 can be used to store any type of software 104. As used herein, the term "software" is intended to encompass an executable computer program that exists permanently or temporarily on any non-transitory computer-readable recordable medium that causes the controller 88 to perform at least a portion of the functions, methods, and/or algorithms described herein. Software includes, but is not limited to, operating systems, Internet browser applications, instructions for calculating the mass of material in the bucket 56, instructions for calculating bail angles, instructions for calculating crowd angles, instructions for calculating moments of inertia, and any other software and/or any type of instructions associated with algorithms, processes, or operations for controlling the general functions and operations of the controller 88. The software may also include computer programs that implement buffers and use RAM to store temporary data.

The communications interface 100 may include various network cards, and circuitry implemented in software and/or hardware to enable wired and/or wireless communications with the distance sensor 60, the torque sensor 82, cameras (not shown), various sensors (not shown), and other electronic devices (not shown). Examples of other electronic devices (not shown) include, but are not limited to, a smart phone, any type of smart device, a cellular phone, a tablet computer, a phablet computer, a laptop computer, a personal computer (PC), and any type of hand-held consumer electronic device having wired or wireless networking capabilities capable of performing the functions, methods, and/or algorithms described herein. Examples of sensors include, but are not limited to, Radio Frequency Identification Devices (RFID), omnidirectional radar devices, and Global Positioning System (GPS) receivers.

Communications include, but are not limited to, receiving distance data from the sensor 60, receiving image data from the cameras 61, and receiving mechanical torque data from the torque sensor 82. By way of example, the communications interface 100 may be a digital subscriber line (DSL) card or modem, an integrated services digital network (ISDN) card, a cable modem, or a telephone modem to provide a data communication connection to a corresponding type of telephone line. As another example, the communications interface 100 may be a local area network (LAN) card (e.g., for Ethernet™ or an Asynchronous Transfer Model (ATM) network) to provide a data communication connection to a compatible LAN. As yet another example, the communications interface 100 may be a wire or a cable connecting the controller 88 with a LAN, or with accessories such as, but not limited to, other electronic devices. Further, the communications interface 100 may include peripheral interface devices, such as a Universal Serial Bus (USB) interface, a PCMCIA (Personal Computer Memory Card International Association) interface, and the like.

The communications interface 100 also allows the exchange of information across networks, for example, the Internet. The exchange of information may involve the transmission of radio frequency (RF) signals through an antenna (not shown).

The user interface 98 and the display 94 allow interaction between an operator of the excavating machine 10 and the controller 88. The display 94 may include a visual display or monitor that displays information. For example, the display 94 may be a Liquid Crystal Display (LCD), an active matrix display, plasma display, or cathode ray tube (CRT). The user interface 98 may include a keypad, a keyboard, a mouse, an illuminator, a signal emitter, a microphone, and/or speakers.

Moreover, the user interface 98 and the display 94 may be integrated into a touch screen display. Accordingly, the display may also be used to show a graphical user interface, which can display various data and provide "forms" that include fields that allow for the entry of information by the operator of the excavating machine 10. Touching the screen at locations corresponding to the display of a graphical user interface allows the person to interact with the controller 88 to enter data, change settings, control functions, etc. Consequently, when the touch screen is touched, the user interface 98 communicates this change to the processor 90, and settings can be changed or user entered information can be captured and stored in the memory 92.

The communications interface may include Radio Frequency Identification (RFID) components or systems for receiving information from other electronic devices (not shown) and for transmitting information to other electronic devices (not shown). The communications interface may alternatively, or additionally, include components with Bluetooth, Zigbee, Near Field Communication (NFC), infrared, or other similar capabilities. Communications between the controller 88 and other electronic devices (not shown) may occur via NFC, RFID, Zigbee, Bluetooth or the like.

Figure 10:
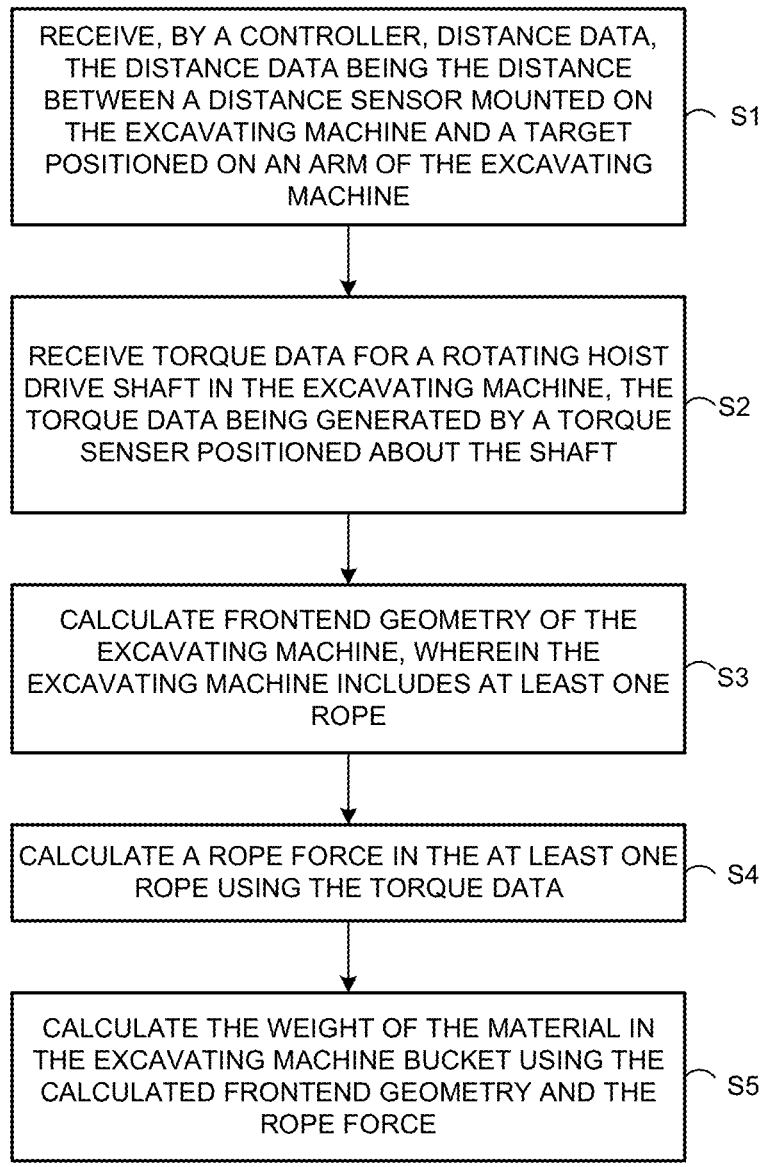
FIG. 10 is an example method and algorithm for calculating the mass of material in the bucket of an excavating machine.

FIG. 10 is a flowchart illustrating an example method and algorithm for calculating the mass of material in the excavating machine bucket 56 according to an embodiment of the present disclosure. FIG. 10 illustrates example operations performed when the controller 88 runs software 104 stored in the memory 92 to calculate the mass of material in the excavating machine bucket 56 before loading a truck. The controller 88 generally automatically runs the software 104.

In step S1, the software 104 executed by the processor 90 causes the controller 88 to receive distance data from the distance sensor 60. The distance data is the distance between the distance sensor 60 mounted on the excavating machine 10 and the target 58 positioned on the crowd arm 50 of the excavating machine 10.

During operation of the excavating machine 10, the distance sensor 60 emits illumination which reflects off the target 58 and other components of the excavating machine 10. The distance sensor 60 receives the reflections. The time of flight of these reflections can be used to calculate the distance between the distance sensor 60 and the target 58 for any position of the bucket 56 during operation of the excavating machine 10. The reflections from the target 58 have a higher reflectivity measurement than the reflective measurements off the other components of the excavating machine 10. As a result, the reflective measurements from the target 58 can be rapidly discriminated from the reflectivity measurements of the other components, which enables calculating in real time the position of the target 58 and thus the distance between the sensor 60 and the target 58.

Because the reflective measurements from the target 58 can be discriminated from each other, less distance data is processed by the controller which facilitates calculating the position of the target 58 and the distance between the target 58 and sensor 60 faster and in real time. As a result, the mass of the material in the bucket 56 is also facilitated to be calculated faster and in real time. The time of flight of the reflections can be used to calculate the distance between the distance sensor 60 and the target 58 for any position of the bucket 56 during operation of the excavating machine 10, which also facilitates calculating the mass of the material in the bucket 56 in any position of the bucket 56 during operation of the excavating machine 10.

Next, in step S2, the software 104 executed by the processor 90 causes the controller 88 to receive mechanical torque data for the rotating hoist drive shaft 74 in the excavating machine 10. The mechanical torque data is generated by a torque sensor 82 positioned about the shaft 74 which also transmits the torque data to the controller 88. The torque sensor can be, for example, a Wheatstone strain gauge-based bridge or a magnetoelastic torque sensor. Unlike in Wheatstone strain gauge-based bridge systems, magnetoelastic torque sensors are not mounted to the hoist drive shaft 74 so there is a gap between the sensor and the shaft 74.

In step S3, the software 104 executed by the processor 90 causes the controller 88 to calculate the frontend geometry of the excavating machine 10. More specifically, the controller calculates the crowd angle α according to the equation $$\sin(A + \alpha) = \frac{h_c}{\sqrt{(X_L + LD_X)^2 + (Y_L + LD_Y)^2}},$$

where A can be calculated from $\sin A = (Y_L + LD_Y)/\sqrt{(X_L + LD_X)^2 + (Y_L + LD_Y)^2}$, and calculates the bail angle θ according to the equation $$\theta = \frac{\pi}{2} + \gamma + \alpha - \varphi - \cos^{-1}\left[-\left(l_B^2 - l_{hst}^2 - l_R^2\right)/(2l_{hst}l_R)\right].$$

After the crowd and bail angles have been calculated, the frontend geometry of the excavating machine 10 can be determined. As a result, the exact location of the bucket 56 can be determined. When the location of the bucket 56 can be determined, all relevant centers of gravity may be determined and the moments summed about the crowd arm pivot point 48 to determine the mass of material in the bucket 56.

The excavating machine 10 includes two hoist cables 62 fed from the hoist cable drum 70. Alternatively, the hoist cable 62 may include more or less than two cables 62.

In step S4, the software 104 executed by the processor 90 causes the controller 88 to calculate a rope force $F_R$ in the cable 62 using the torque data. More specifically the rope force $F_R$ may be calculated according to the equation $$F_R = \frac{GR}{R_D} \cdot T,$$

where:
$F_R$ is the rope force;
GR is the hoist drive gear ratio;
$R_P$ is the radius from the centerline of the hoist drum to the centerline of the hoist rope; and
T is the torque data.

As described herein, there are two hoist cables 62 fed from the hoist cable drum 70. Thus, the calculated rope force $F_R$ is divided equally between the two cables such that a force of $F_R/2$ is applied to each cable 62. Next, in step S5, the software 104 executed by the processor 90 causes the controller 88 to calculate the mass of material in the excavating machine bucket 56 using the calculated frontend geometry and rope force $F_R$. More specifically, the controller calculates the mass of the material in the bucket 56 according to the equation $$M_P = \frac{F_R}{g} \frac{[l_{st}\cos(\theta - \alpha) + (h_c + h_B - R_P)\sin(\theta - \alpha)] - M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

It is contemplated by the present disclosure that the mechanical torque imparted on the hoist drive shaft 74 by the hoist drive motor 72, causes the hoist cables 62 to stretch or relax depending on whether the mechanical torque is increasing or decreasing, respectively. This stretching and relaxing represents a conservative torque affecting the amount of torque ultimately delivered to the bucket 56 by the rope force $F_R$. To compensate for this conservative effect, inertial loads due to the acceleration of the bucket 56 and the angular acceleration of the drive components is calculated and combined with the measured mechanical torque produced by the hoist drive motor 72 and measured by the torque sensor 82 to calculate the payload or mass of the material in the bucket 56.

The optical shaft speed encoder 84 can be used to determine the angular velocity of the hoist drive shaft 74 and scaled using the reduction gear box ratio to obtain the angular velocity of the hoist cable drum 70. The angular velocity can be differentiated to obtain the angular acceleration of the hoist cable drum 70. Numerical differentiation can be applied to obtain the linear crowd acceleration along the longitudinal axis of the crowd arm 50 and the angular acceleration of the crowd arm 50 about the crowd arm pivot point 48. The angular acceleration of the hoist cable drum 70, the angular acceleration of the crowd arm 50, and the linear acceleration of the crowd arm 50 can be applied to formulate the inertial loading and to calculate the mass of the material in the bucket 56 compensated for by the inertial forces.

The information shown in FIG. 11 includes some of the same information shown in FIG. 1 as described in more detail below. As such, features illustrated in FIG. 11 that are identical to features illustrated in FIG. 1 are identified using the same reference numerals used in FIG. 1.

Figure 11:
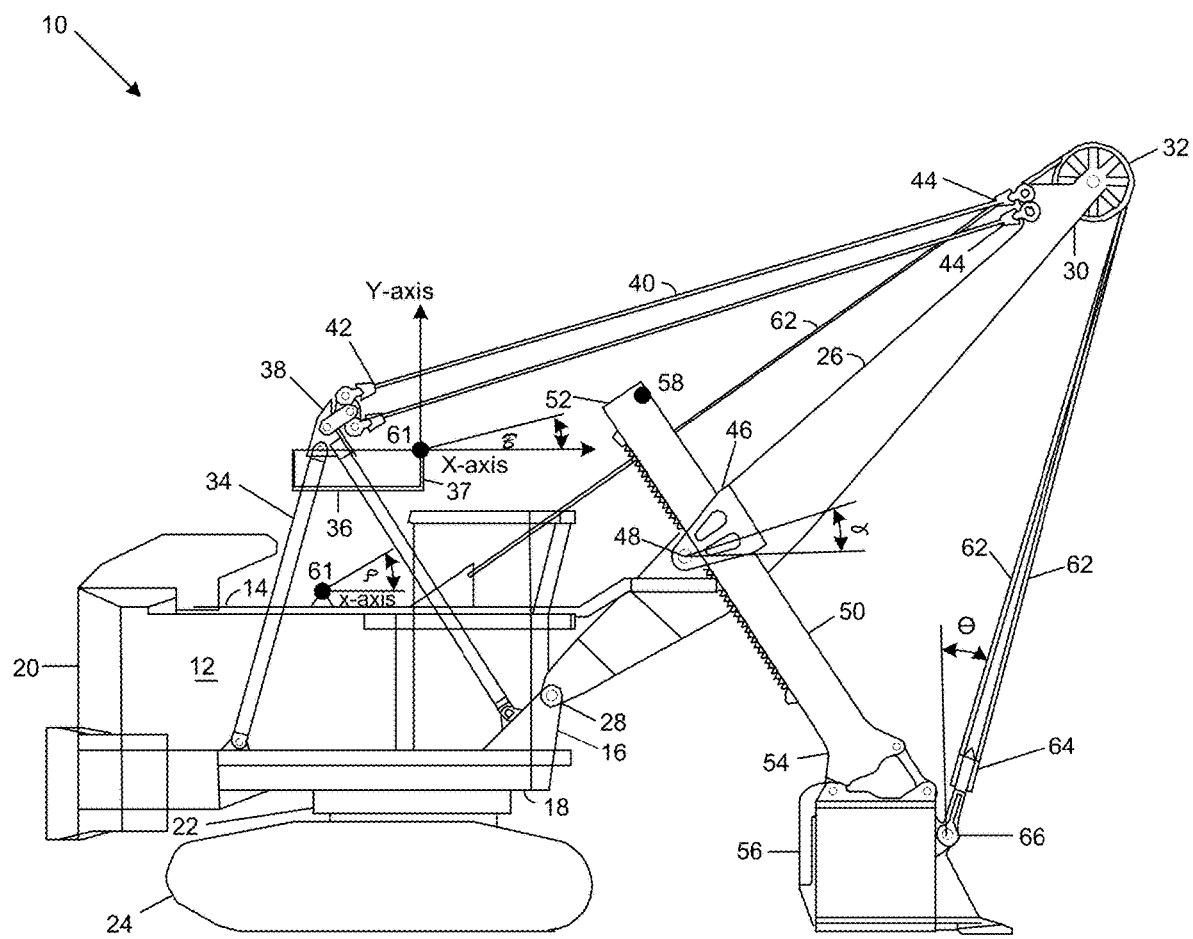
FIG. 11 is a side view of the example excavating machine as shown in FIG. 1 including cameras instead of a distance sensor.

FIG. 11 is a side view of the excavating machine 10 as shown in FIG. 1. However, the excavating machine 10 includes cameras 61 instead of the distance sensor 60.

The cameras 61 can be imaging devices configured to record image data of at least the target 58. Moreover, the cameras 61 are capable of recording image data under any lighting conditions including infrared light. The cameras 61 are sensors. The cameras 61 are typically external to the excavating machine 10 but may be internal to the machine 10. Each camera 61 incorporates a sensor, for example and without limitation, a CCD or CMOS sensor.

The cameras 61 can be located at any position on the excavating machine 10 that is also in the plane of the target 58. For example, one of the cameras 61 may be located on the side 37 of the platform 36 and another camera 61 may be located on top of the machinery house 12. Thus positioned, the cameras are both in the plane of the target 58. A two-dimensional cartesian coordinate system with X and Y-axes may be mathematically superimposed on the location of one or both cameras 61.

An angle beta, β, is between the camera 61 mounted on the side 37 of the platform 36 and the target 58, while an angle rho, ƒ, is between the camera 61 mounted on the top 14 of the machinery house 12 and the target 58. The angles β and ƒ are measured with respect to the X-axis. However, the angles β and ƒ may alternatively be measured with respect to the Y-axis. Moreover, the angles may be measured with respect to different axes. For example, the angle β may be measured with respect to the X-axis while the angle ƒ is measured with respect to the Y-axis.

The angles β and ƒ change as the excavating machine 10 operates, and may be used to facilitate calculating and tracking the position of the target 58 relative to each of the cameras 61 during operation of the excavating machine 10. The location of the cameras 61 can be calculated using X and Y coordinates and the azimuth orientation of each camera 61 relative to the excavating machine 10 can also be calculated.

The cameras 61 capture image data of the target 58 while the target 58 and the excavating machine 10 move during operation. As used herein, capture means to record temporarily or permanently image data of any part of the excavating machine 10. Image data may be a digital image, a sequence of digital images, or a video. Each digital image is included in a frame. The cameras 61 may record image data of the target 58 and any other part of the excavating machine 10 in one or more photographs or digital images, or by taking a video. The cameras 61 may record a sequence of digital images at irregular or regular intervals. A video is an example of a sequence of digital images being captured at a regular interval. Captured image data may be temporarily or permanently stored in a memory of the camera, in the memory 92, or in any device capable of communicating with the controller 88.

The coordinate of each camera 61 and the azimuth orientation of each camera with respect to the excavating machine 10 can be used to triangulate the location of the target 58 in each frame of captured image data. The location of the target 58 may be calculated in X and Y-coordinates relative to any established reference point on the excavating machine 10. Thus, it can be seen that capturing and analyzing the image data, together with the geometric location of the cameras 61, facilitates locating the target 58 in X and Y-coordinates.

After determining the location of the target 58 in a frame, the in-plane distance of the target 58 from the reference point for the frame can be calculated. The in-plane distance can be used to calculate the crowd angle using the equation $$\sin(A + \alpha) = \frac{h_c}{\sqrt{(X_L + LD_X)^2 + (Y_L + LD_Y)^2}}$$

and the bail angle can be calculated using the equation $$\theta = \frac{\pi}{2} + \gamma + \alpha - \varphi - \cos^{-1}\left[-\left(l_B^2 - l_{hst}^2 - l_R^2\right)/(2l_{hst}l_R)\right].$$

The mass of the material in the bucket 56 can be calculated using the equation $$M_P = \frac{F_R}{g} \frac{M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

It is contemplated by the present disclosure that instead of using the distance sensor 60 or the cameras 61, a Radio Frequency Identification Device (RFID) locator chip may be mounted on the target 58 and two receiving base stations may be mounted on the excavating machine 10. Each base station may be configured to receive a signal from the RFID locator chip. The base stations could transmit the signal or information derived from the signal to the controller 88. The controller 88 could use the signal or information to triangulate the location of the RFID chip and the target 58 relative to each base station. The crowd and bail angles may be calculated, thus the mass of the material in the bucket 56 may also be calculated.

Alternatively, omnidirectional radar devices could be used. More specifically, two omnidirectional radar devices could be mounted at a known location on the excavating machine 10. Both devices could generate the distance to the target 58. The distances could be transmitted to the controller 88 which could use triangulation techniques to calculate the crowd angle and the bail angle. The mass of the material in the bucket 56 can be calculated using the bail and crowd angles.

As another alternative, miniature battery powered Global Positioning System (GPS) receivers may be positioned on the crowd arm 50. Another GPS receiver may be located at a fixed position on the excavating machine 10. The position of the GPS receivers may be tracked relative to the fixed GPS receiver during operation of the excavating machine 10. The data could be transmitted to the controller 88 which could use triangulation techniques to calculate the crowd angle and the bail angle. The crowd and bail angles could then be used to calculate the mass of material in the bucket 56.

Blue tooth devices and a local GPS triangulation system could alternatively be used to collect data and use triangulation techniques to calculate the crowd and bail angles.

The methods described herein for locating the target 58 may also be applied to determine the linkage geometry on any type of excavating machine including, but not limited to, hydraulic excavators.

The method for calculating the mass of material in an excavating machine bucket as described herein facilitates quickly and accurately calculating the mass of material in an excavating machine bucket and considers inertial loads in the calculation. As a result, an operator of the excavating machine 10 can receive in real time information regarding the mass of the material in the bucket 56 before dumping the material into a truck. Operators can use the information to properly and accurately load trucks which facilitates reducing bunching and related bottlenecks along a haul route and truck fatigue damage which is expensive to repair and increases maintenance costs. Additionally, mine productivity is facilitated to be enhanced by reducing load variances between trucks which facilitates optimizing haul route travel time, minimizing gaps between trucks and maximizing throughput. Moreover, the equipment used to implement the example method described herein is not complex and is easily installed and calibrated. The equipment requires little maintenance because the equipment is located on the machinery house instead of on the bucket 56, or other component of the excavating machine 10 that is exposed to a harsh environment. As a result, the throughput of an autonomous haul fleet operation is enhanced while costs are facilitated to be reduced.

The above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

What is claimed is:

1. A method for calculating the mass of material in an excavating machine bucket comprising the steps of:
   receiving, by a controller, data for determining the distance between at least one sensor mounted on the excavating machine and a target positioned on an arm of the excavating machine;
   receiving torque data for a rotating hoist drive shaft in the excavating machine, the torque data being generated by a torque sensor positioned about the shaft;
   calculating front end geometry of the excavating machine, wherein the excavating machine includes at least one rope;
   calculating a rope force in the at least one rope using the torque data; and
   calculating the mass of material in the excavating machine bucket using the calculated frontend geometry and the rope force.

2. The method according to claim 1, wherein:
   the target is positioned at an end of the arm;
   the at least one sensor is attached to an A-frame platform of the excavating machine; and
   the at least one sensor detects reflections off the target to determine the data for determining the distance between the at least one sensor and the target.

3. The method according to claim 1, said calculating frontend geometry step further comprising calculating a crowd angle and a bail angle using the data and geometry of the excavating machine.

4. The method according to claim 1, further comprising calculating an angular velocity and an angular acceleration about a crowd pivot of the excavating machine.

5. The method according to claim 1, said calculating the mass of material in the excavating machine bucket step comprising calculating the mass of material according to the equation $$M_P = \frac{F_R}{g} \frac{[l_{st}\cos(\theta-\alpha) + (h_c + h_B - R_P)\sin(\theta-\alpha)] - M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

where:
- $M_P$ is the payload, or the mass of the material in the bucket;
- $F_R$ is the rope force in units of mass;
- $\alpha$ is the crowd angle;
- $\theta$ is the bail angle;
- g is the magnitude of the gravity vector and is defined as unity;
- $l_{st}$ is the distance from the crowd point to the bail pivot point;
- $h_c$ is the height from the crowd point to the target measured perpendicular to the arm;
- $h_B$ is the distance from the target to the bail point measured perpendicular to the arm;
- $R_P$ is the radius of the crowd pinion;
- $M_E$ is the mass of the empty bucket assembly;
- $X_{gE}$ is the distance from the center of gravity of the empty bucket assembly to the bail pivot measured along the longitudinal axis of the arm, and $Y_{gE}$ is the distance from crowd pivot to the center of gravity of the empty bucket assembly measured along an axis perpendicular to the arm; and
- $X_{gP}$ is the distance from the bail pivot to the center of gravity of the payload as measured along the longitudinal axis of the arm, and $Y_{gP}$ is the distance from crowd pivot to the center of gravity of the payload measured along an axis perpendicular to the arm.

6. The method according to claim 1, further comprising the step of calculating an inertial correction of the mass of material using an angular acceleration about the crowd pivot and a bucket assembly mass moment of inertia about the crowd pivot.

7. The method according to claim 1, wherein the excavating machine includes a hoist motor and a hoist gear box, the method further comprising positioning the torque sensor between the hoist and the hoist bear box.

8. The method according to claim 1, said calculating a rope force step further comprising calculating the rope force according to the equation $$F_R = \frac{GR}{R_D} \cdot T,$$

where:
- $F_R$ is the rope force;
- GR is the hoist drive gear ratio;
- $R_D$ is the radius from the centerline of the hoist drum to the centerline of the hoist rope; and
- T is the torque data.

9. A controller for calculating the mass of material in an excavating machine bucket comprising:
a processor; and
a memory configured to store data, said controller being associated with a network and said memory being in communication with said processor and having instructions stored thereon which, when read and executed by said processor, cause said controller to:
receive data for determining the distance between at least one sensor mounted on the excavating machine and a target positioned on an arm of the excavating machine;
receive torque data for a rotating hoist drive shaft in the excavating machine, the torque data being generated by a torque sensor positioned about the shaft;
calculate frontend geometry of the excavating machine, wherein the excavating machine includes at least one rope;
calculate a rope force in the at least one rope using the torque data; and
calculate the mass of material in the excavating machine bucket using the calculated frontend geometry and the rope force.

10. The controller according to claim 9, wherein:
the target is positioned at an end of the arm;
the at least one sensor is attached to an A-frame platform of the excavating machine; and
the at least one sensor detects reflections off the target to determine the data for determining the distance between the at least one sensor and the target.

11. The controller according to claim 9, wherein the instructions when read and executed by said processor, cause said controller to calculate a crowd angle and a bail angle using the data and geometry of the excavating machine.

12. The controller according to claim 9, wherein the instructions when read and executed by said processor, cause said controller to calculate an angular velocity and an angular acceleration about a crowd pivot of the excavating machine.

13. The controller according to claim 9, wherein the instructions when read and executed by said processor, cause said controller to calculate the mass of material in the excavating machine bucket according to the equation $$M_P = \frac{F_R}{g} \frac{[l_{st}\cos(\theta-\alpha) + (h_c + h_B - R_P)\sin(\theta-\alpha)] - M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

where:
- $M_P$ is the payload, or the mass of the material in the bucket;
- $F_R$ is the rope force in units of mass;
- $\alpha$ is the crowd angle;
- $\theta$ is the bail angle;
- g is the magnitude of the gravity vector and is defined as unity;
- $l_{st}$ is the distance from the crowd point to the bail pivot point;
- $h_c$ is the height from the crowd point to the target measured perpendicular to the arm;
- $h_B$ is the distance from the target to the bail point measured perpendicular to the arm;
- $R_P$ is the radius of the crowd pinion;
- $M_E$ is the mass of the empty bucket assembly;
- $X_{gE}$ is the distance from the center of gravity of the empty bucket assembly to the bail pivot measured along the longitudinal axis of the arm, and $Y_{gE}$ is the distance from crowd pivot to the center of gravity of the empty bucket assembly measured along an axis perpendicular to the arm; and
- $X_{gP}$ is the distance from the bail pivot to the center of gravity of the payload as measured along the longitudinal axis of the arm, and $Y_{gP}$ is the distance from crowd pivot to the center of gravity of the payload measured along an axis perpendicular to the arm.

14. The controller according to claim 9, wherein the instructions when read and executed by said processor, cause said controller to calculate an inertial acceleration about the crowd pivot and a bucket assembly mass moment of inertia about the crowd pivot.

15. The controller according to claim 9, wherein the instructions when read and executed by said processor, cause said controller to calculate the rope force according to the equation $$F_R = \frac{GR}{R_D} \cdot T,$$

where:
- $F_R$ is the rope force;
- GR is the hoist drive gear ratio;
- $R_D$ is the radius from the centerline of the hoist drum to the centerline of the hoist rope; and
- T is the torque data.

16. An excavating machine comprising:
a machinery house including an A-frame platform;
an arm;
a hoist motor, a rotating hoist drive shaft, and a hoist gear box, wherein a torque sensor is positioned about the rotating hoist drive shaft between the hoist motor and hoist gear box;
a rope;
a bucket; and
a controller including a processor and a memory configured to store data, the memory being in communication with the processor and having instructions stored thereon which, when read and executed by said processor, cause said controller to:
receive data for determining the distance between at least one sensor mounted on the excavating machine and a target positioned on an end of the arm;
receive torque data generated by the torque sensor;
calculate frontend geometry of the excavating machine;
calculate a rope force in the rope using the torque data; and
calculate the mass of material in the bucket using the calculated frontend geometry and the rope force.

17. The excavating machine according to claim 16, wherein the at least one sensor detects reflections off the target to determine the data for determining the distance between the at least one sensor and the target.

18. The excavating machine according to claim 16, wherein the instructions when read and executed by the processor, cause the controller to:
calculate a crowd angle and a bail angle using the data and geometry of the excavating machine; and
calculate an angular velocity and an angular acceleration about a crowd pivot of the excavating machine.

19. The excavating machine according to claim 16, wherein the instructions when read and executed by the processor, cause the controller to calculate the mass of material in the bucket according to the equation $$M_P = \frac{F_R}{g} \frac{M_E g[(X_{gE} + l_{st})\cos\alpha - (Y_{gE} - R_P)\sin\alpha]}{(X_{gP} + l_{st})\cos\alpha - (Y_{gP} - R_P)\sin\alpha}$$

where:
- $M_P$ is the payload, or the mass of the material in the bucket;
- $F_R$ is the rope force in units of mass;
- $\alpha$ is the crowd angle;
- $\theta$ is the bail angle;
- g is the magnitude of the gravity vector and is defined as unity;
- $l_{st}$ is the distance from the crowd point to the bail pivot point;
- $h_c$ is the height from the crowd point to the target measured perpendicular to the arm;
- $h_B$ is the distance from the target to the bail point measured perpendicular to the arm;
- $R_P$ is the radius of the crowd pinion;
- $M_E$ is the mass of the empty bucket assembly;
- $X_{gE}$ is the distance from the center of gravity of the empty bucket assembly to the bail pivot measured along the longitudinal axis of the arm, and $Y_{gE}$ is the distance from crowd pivot to the center of gravity of the empty bucket assembly measured along an axis perpendicular to the arm; and
- $X_{gP}$ is the distance from the bail pivot to the center of gravity of the payload as measured along the longitudinal axis of the arm, and $Y_{gP}$ is the distance from crowd pivot to the center of gravity of the payload measured along an axis perpendicular to the arm.

20. The excavating machine according to claim 16, wherein the instructions when read and executed by the processor, cause the controller to calculate an inertial acceleration about a crowd pivot and a bucket assembly mass moment of inertia about the crowd pivot.

* * * * *